Aug. 3, 1954     E. C. SHAW     2,685,458
COUPLING FOR HYDRAULIC HOSE
Filed Nov. 3, 1951     2 Sheets-Sheet 1
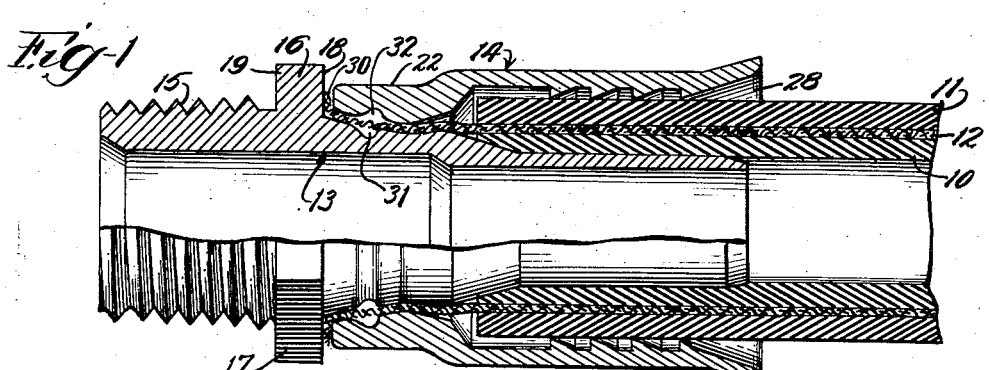
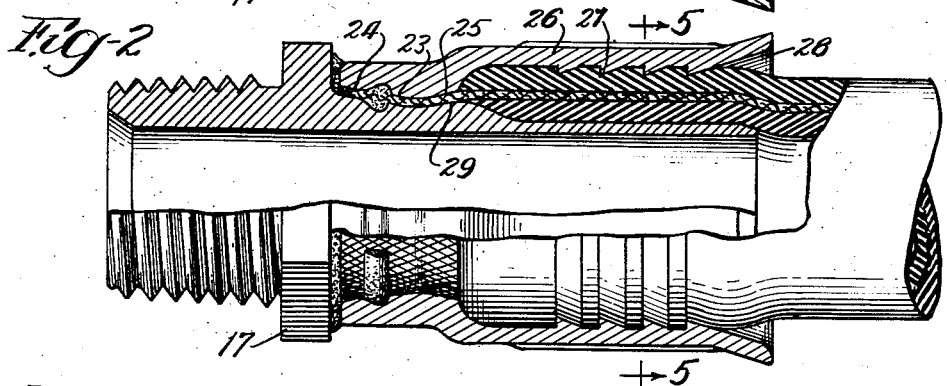
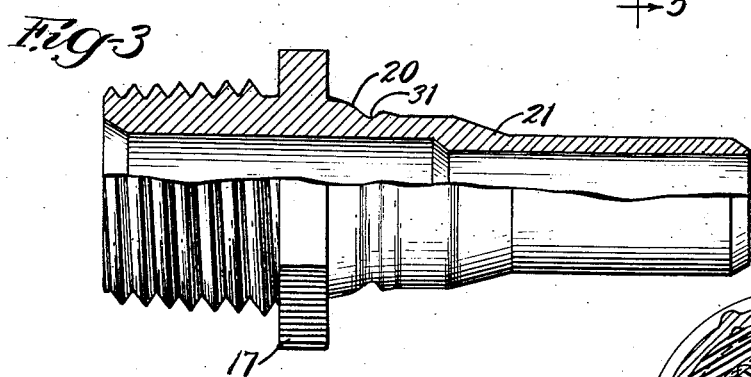
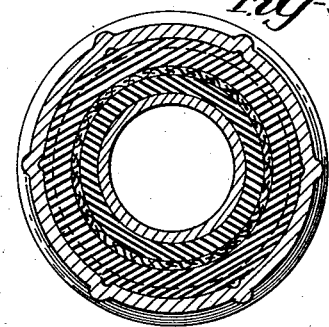
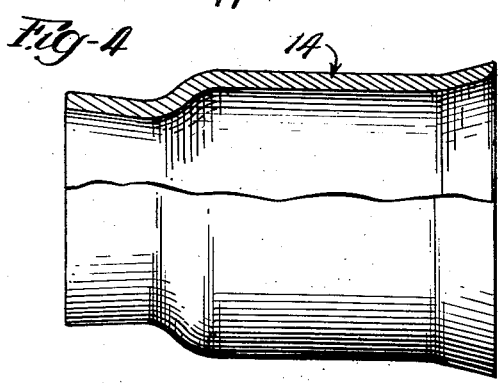
INVENTOR.
Ernest C. Shaw
BY
Mann, Brown & Hansmann
Attys.

Aug. 3, 1954 — E. C. SHAW — 2,685,458
COUPLING FOR HYDRAULIC HOSE
Filed Nov. 3, 1951 — 2 Sheets-Sheet 2
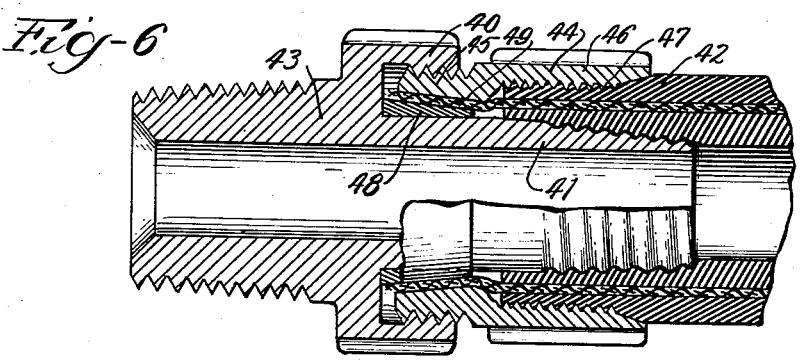
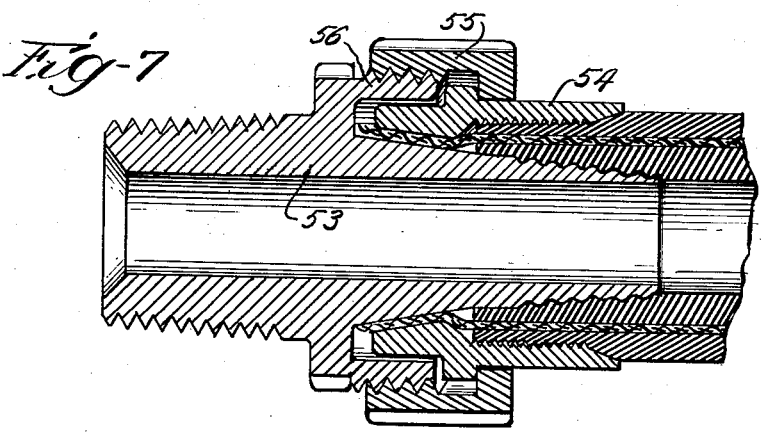
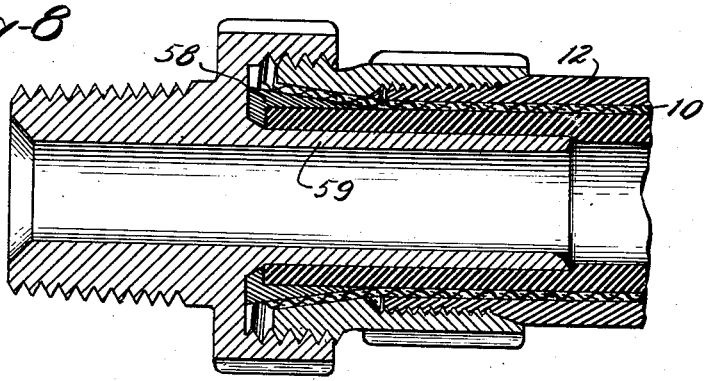
INVENTOR.
Ernest C. Shaw
BY Mann, Brown & Hansmann.
Attys.

Patented Aug. 3, 1954

2,685,458

UNITED STATES PATENT OFFICE 2,685,458

COUPLING FOR HYDRAULIC HOSE

Ernest C. Shaw, Flossmoor, Ill.

Application November 3, 1951, Serial No. 254,711

5 Claims. (Cl. 285—74)

This invention relates to couplings for flexible hose such as commonly used for hydraulic fluid in ground working machinery, tanks, etc.; and the principal object of the invention is to provide:

1. A mechanical connection between the metallic coupling and the braided tube of the hose that is equal to the strength of that tube;

2. A connection that will prevent progressive creep between the coupling and the hose due to load shocks; and 3. A connection in which the braided tube is so anchored that it grips the enclosed parts and increases the hydraulic seal in proportion to the hydaulic pressure.

Generally speaking, this is accomplished by making the coupling of telescoping elements that grip the end portion of the braided tube and hold it fast against both direct pulling and hydraulic pressure.

Further objects and advantages of the invention will appear as the disclosure proceeds and the description is read in connection with the accompanying drawings, in which Fig. 1 is a longitudinal section through the end portion of hydraulic hose and a coupling therefor embodying this invention, the parts being in the position they are arranged preparatory to fastening;

Fig. 2 is a similar view showing the parts made fast;

Fig. 3 is a half section through a body portion of the coupling;

Fig. 4 is a half section through a drawn metal nipple for use with the body portion;

Fig. 5 is a transverse section through the coupling and the hose;

Fig. 6 is a longitudinal section corresponding to Fig. 1 showing a different embodiment especially useful where the coupling parts are to be reused with new pieces of hose, or, for convenience in manufacture, the fittings are applied to pieces of hose of different length required by the customer;

Figs. 7 and 8 are similar sections of similar but different embodiments of the same character.

Hydraulic hose of commerce is commonly made up of inner and outer layers 10 and 11 of rubber or rubber compositions. The laminated hose thus formed is given strength or reinforced by one or more layers 12 of braided material, sometimes metallic wire and sometimes vegetable fiber. The problem solved by this invention is in connecting a length of such hose to parts of machinery.

In the form shown in Figs. 1-5, the hose coupling is made up of a tubular body portion generally indicated by 13 and a ferrule generally indicated by 14.

The body portion is shown threaded at 15 for connection with the parts of machinery. Adjacent to the threaded portion there is a collar 16 having a wrench seat 17 and defined by shoulders 18 and 19.

Adjacent to and projecting away from the shoulder 18, the body is provided with an external, tapered portion 20 integral with a long thin shank 21 of smaller interior and exterior diameter.

The ferrule includes a strong tube 22 having an internal, tapered portion 23 corresponding to the tapered portion 20 on the body, but of sufficiently large diameter to telescope over it with the exposed end 24 of the braided tube 12 between those tapered portions.

The ferrule also has an oppositely tapered portion 25 adjacent to the tapered portion 24, and beyond that is a tubular skirt 26 serrated on the inside at 27 and flared at the end 28.

Preparatory to assembling the coupling parts with the hydraulic hose, the inner and outer layers 10 and 11 are stripped or removed to expose a suitable length of the braided tube indicated by 24.

The ferrule is slipped over the prepared end of the hose to substantially the position shown in Fig. 1. The shank 21 of the body is inserted into the hose and the body is brought into substantially the position shown in Fig. 1, where the tapered portion 20 of the body telescopes with the tapered portion 23 of the ferrule and grips the exposed portion of the braided tube 12 near the end thereof.

The grip afforded by the telescoping tapered portions 20 and 23 makes a mechanical connection with the braided tube that is equal to the tensile strength of that tube for all practical purposes.

In order to make the coupling fast to the tube, a swaging tool is passed through the body and the shank portion is expanded from the condition shown in Fig. 1 to that shown in Fig. 2, in which the metal 29 of the body is expanded into the tapered portion 25 opposite to the tapered portion 23, and thereby locks the body and the ferrule in position with the braided tube grasped firmly between the tapered portions 20 and 23.

By the swaging of the long shank 21, it is enlarged as indicated in Fig. 2 and becomes tightly fitted into the inner layer 10 of the hose to make a good hydraulic connection. This is also increased by crimping the portion 26 of the ferrule to shrink it from the form shown in Fig. 1 to that shown in Fig. 2, by which the serrations 27 are imbedded in the outer layer 11 of the hose, and the entire volume of the hose between the ferrule portion 26 and the shank portion 21 is compressed and gripped tightly and firmly.

In the ordinary use of hydraulic apparatus, the pressure is put on and taken off or applied and released frequently with the result that there is a tendency for the hose to progressively creep with respect to the coupling. According to this invention, that action is effectively prevented by making an additional fastening between the end portion of the braided tube 12 and the body and ferrule of the coupling. When the braided tube is made of metallic wire, this is effectively accomplished by soldering at 30 where the ends of the wire and the braid are exposed between the shoulder 18 on the body and the adjacent portion of the ferrule 22. That fastens the body, the ferrule, and the braided tube together.

In addition, solder may be put into mating grooves 31 and 32 in the body and the ferrule, respectively, by placing a length of solder wire in the grooves before assembly and fusing it after the parts are in the position shown in Figs. 1 and 2—preferably the latter. Low melting point solder is satisfactory.

Preferably also, the heat is applied by induction heating apparatus so that it may be quickly done before there is any appreciable annealing or softening of the metallic wire or injury to the rubber.

Alternatively, this auxiliary fastening can be effected by using non-metallic thermo-plastic materials, such as the cellulose acetate butyrate molding composition known as "Tenite" II, or phenolformaldehyde resins known as Bakelite, Durez, Makalot, Colasta, etc.

The non-metallic materials can be used with metallic braided tubing and vegetable braiding tubing.

Ordinarily, the solder or the like applied to the end portions of the braided tube at 30 will be sufficient.

When additional solder is required or thought to be required, it may be applied in the groove 31 alone. Since the body portion 13 will be machined, that groove can be made without material addition to the cost.

The ferrule 14 shown in Fig. 1 is a form most conveniently made by casting and machining, but in many instances it will be an advantage to use a drawn ferrule, which is illustrated in Fig. 4, and lends itself readily to manufacture and to crimping as indicated in Fig. 5.

It will be found expedient to apply a little solder or the like to the end of the braided tube 12 before removing the outer layer 11 in order to restrain the tendency to unravel during the assembly operation.

The tapered portions 20 and 23, here shown, are on the order of 7½ degrees, which is very satisfactory, because it provides an extremely strong mechanical gripping connection regardless of accumulation of tolerances in the ordinary manufacturing processes. As the tapers more nearly approach cylinders, the effect of accumulated tolerances is increased, and the difficulties of manufacture correspondingly increase.

Tapers of greater angularity than 7½ degrees will reduce the effect of accumulated tolerances.

In the embodiment shown in Fig. 6, the body 43 and the ferrule 44 are connected by threaded flanges 40 and 45. The skirt 46 of the nipple is threaded at 47 to screw onto the outer layer of the hose. The shank 41 of the body has round, coarse threads 42 for engagement with the inside of the inner layer of the hose.

The taper corresponding to 20 in the form first disclosed is supplied by a slip ring 48, which cooperates with the internal taper 49 in the ferrule.

The assembly of the coupling shown in Fig. 6 with the hose may be effected by screwing the ferrule onto the hose, putting the slip ring on the body, and screwing it into the hose and simultaneously running the threads of the flange 40 onto the flange 45, wrench seats on the respective parts being provided for that purpose.

The gripping action between the telescoping tapered surfaces is mechanically equivalent to that in the form first described, but the coupling lacks the insurance against progressive creep effected by the solder or other supplementary fastening.

In Fig. 7, the connection between the body 53 and the ferrule 54 is by a union 55 screwed onto a flange 56. That arrangement eliminates the separate slip ring and puts the external taper on the body in substantially the same position as in the two forms earlier described.

In commercial hydraulic hose, the inner layer 10 is frequently not bonded to the braided layer 12, which makes it easy to insert a tapered ring 58 between the two layers, as shown in Fig. 8, and assemble the coupling substantially as shown in Fig. 6. This has the advantage of preserving the full length of the inner layer 9 and wedging it tightly against the shank 59, as shown in Fig. 8, to effect a good hydraulic seal. In that figure, the body is shown screwed onto the ferrule as in Fig. 6, though, of course, it may be drawn up and made fast by union, as shown in Fig. 7.

In all forms of the coupling here shown, the anchoring of the end portion of the braided layer 12 results in an increase of hydraulic seal in proportion to the hydraulic pressure, because the braided tube tends to shrink under the application of tension, and that tendency to shrink makes the braided wires increase the binding pressure on the inner layer 10 and against the shank of the body portion of the coupling.

In all the forms here shown, the fittings may be sold separately and may be used with hose of different construction, as the customer may find desirable or expedient.

The forms shown in Figs. 6, 7 and 8 are especially advantageous where the owner wishes to reapply the fittings to new or different hose. They also enable the manufacturer to readily assemble hose lengths with fittings to suit the varied requirements of any customer.

I claim:

1. In a hose coupling for a flexible hose having tubular layers of rubber-like material and a flexible layer of woven material having a bared length protruding from said layers, a tubular body having an external tapered portion telescoped within said length, a ferrule having an internal complementally tapered portion telescoped over said length and over the tapered portion of the body and having an outwardly flaring portion inwardly thereof, with a portion of the body inwardly of the tapered portion of the body outwardly flaring and mechanically clamping said length against the flaring portion of the ferrule and forming a fluid seal, and a thermoplastic material securing the tapered portions of the body and ferrule to each other and to the interposed length of woven material and extending only to said fluid seal.

2. In a hose coupling for a flexible hose having tubular layers of rubber-like material and a flexible layer of woven material having a bared length protruding from said layers, a tubular body having an external tapered portion telescoped within said length, a ferrule having an internal complementally tapered portion telescoped over said length and over the tapered portion of the body and having an outwardly flaring portion inwardly thereof, with a portion of the body inwardly of the tapered portion of the body outwardly flaring and mechanically clamping said length against the flaring portion of the ferrule and forming a fluid seal, and a thermoplastic material securing the body and the ferrule to each other and to the interposed length of woven material and being disposed in a groove in one of said tapered portions and extending therefrom to said fluid seal.

3. In a hose coupling for a flexible hose having tubular layers of rubber-like material and a flexible layer of woven material having a bared length protruding from said layers, a tubular body having an external tapered portion telescoped within said length, a ferrule having an internal complementally tapered portion telescoped over said length and over the tapered portion of the body and having an outwardly flaring portion inwardly thereof, with a portion of the body inwardly of the tapered portion of the body outwardly flaring and mechanically clamping said length against the flaring portion of the ferrule and forming a fluid seal, and a thermoplastic material securing the body and the ferrule to each other and to the interposed length of woven material and being disposed in mating grooves in said tapered portions and extending therefrom to said fluid seal.

4. In a hose coupling for a flexible hose having tubular layers of rubber-like material and a flexible layer of metallic woven material having a bared length protruding from said layers, a tubular metallic body having an external tapered portion telescoped within said length, a metallic ferrule having an internal complementally tapered portion telescoped over said length and over the tapered portion of the body and having an outwardly flaring portion inwardly thereof, with a portion of the body inwardly of the tapered portion of the body outwardly flaring and mechanically clamping said length against the flaring portion of the ferrule and forming a fluid seal, and solder securing the tapered portions of the body and the ferrule to each other and to the interposed length of woven material and extending only to said fluid seal.

5. In a hose coupling for a flexible hose having tubular layers of rubber-like material and a flexible layer of metallic woven material having a bared length protruding from said layers, a tubular metallic body having an external tapered portion telescoped within said length, a metallic ferrule having an internal complementally tapered portion telescoped over said length and over the tapered portion of the body and having an outwardly flaring portion inwardly thereof, with a portion of the body inwardly of the tapered portion of the body outwardly flaring and mechanically clamping said length against the flaring portion of the ferrule and forming a fluid seal, the tapered portions of the body and ferrule being secured directly to each other and to the interposed length of woven material by fused metal through an area extending only to said fluid seal.

References Cited in the file of this patent

UNITED STATES PATENTS

| Number | Name | Date |
| --- | --- | --- |
| 1,630,895 | Herbst | May 31, 1927 |
| 1,762,548 | Davis | June 10, 1930 |
| 2,374,224 | Melsom | Apr. 24, 1945 |
| 2,384,635 | Melsom | Sept. 11, 1945 |
| 2,520,372 | Phillips | Aug. 29, 1950 |
| 2,550,583 | Millar | Apr. 24, 1951 |

FOREIGN PATENTS

| Number | Country | Date |
| --- | --- | --- |
| 3,052 | Great Britain | Feb. 8, 1909 |